(12) United States Patent
Folken et al.

(10) Patent No.: US 8,950,446 B2
(45) Date of Patent: Feb. 10, 2015

(54) GENESET FUEL TRANSFER SYSTEM AND METHOD

(75) Inventors: Keith Folken, West Peoria, IL (US);
Joydip Chakravarty, Peoria, IL (US);
Edward M. Schroeder, Germantown Hills, IL (US); Andrew W. Black, Antrim (IE); Nelson Slaughter, Locust Grove, GA (US)

(73) Assignee: Caterpillar Inc., Peoria, IL (US)

( * ) Notice: Subject to any disclaimer, the term of this patent is extended or adjusted under 35 U.S.C. 154(b) by 119 days.

(21) Appl. No.: 13/071,608

(22) Filed: Mar. 25, 2011

(65) Prior Publication Data

US 2012/0168023 A1 Jul. 5, 2012

Related U.S. Application Data

(60) Provisional application No. 61/317,882, filed on Mar. 26, 2010.

(51) Int. Cl.
*B65B 1/30* (2006.01)
*F02D 29/06* (2006.01)
*F01D 15/10* (2006.01)
*F02M 51/02* (2006.01)
*F02C 9/26* (2006.01)

(52) U.S. Cl.
CPC ............... *F02D 29/06* (2013.01); *F01D 15/10* (2013.01); *F02M 51/02* (2013.01); *F02C 9/26* (2013.01)
USPC ................... 141/95; 141/1; 141/94; 290/4 D; 137/565.31; 340/613; 340/618

(58) Field of Classification Search
USPC ............. 141/1, 95, 94; 137/557, 558, 565.31; 222/51; 340/612–626; 290/4 D, 40 R
See application file for complete search history.

(56) References Cited

U.S. PATENT DOCUMENTS

| | | | | |
|---|---|---|---|---|
| 3,866,108 A | * | 2/1975 | Yannone et al. | 322/14 |
| 4,259,835 A | * | 4/1981 | Reed et al. | 60/39.281 |
| 4,403,647 A | * | 9/1983 | Melley, Jr. | 165/11.2 |
| 4,536,126 A | * | 8/1985 | Reuther | 290/40 R |
| 5,731,688 A | * | 3/1998 | Thomson | 322/22 |
| 6,172,428 B1 | * | 1/2001 | Jordan | 290/40 C |
| 7,064,454 B2 | * | 6/2006 | Fukaya et al. | 290/1 A |
| 7,262,516 B2 | * | 8/2007 | Kleen | 290/40 C |
| 7,360,529 B2 | * | 4/2008 | Ziegler et al. | 123/509 |

(Continued)

FOREIGN PATENT DOCUMENTS

| | | |
|---|---|---|
| CN | 2884688 | 3/2007 |
| CN | 201125814 | 10/2008 |
| WO | 2004-037595 | 5/2004 |

*Primary Examiner* — Timothy L Maust
(74) *Attorney, Agent, or Firm* — Miller, Matthias & Hull (57) ABSTRACT

An electric generator set fuel control system is disclosed. The fuel control system includes an electric generator, a prime mover mechanically coupled to the generator, a first fuel tank, a fuel level sensor configured to generate a fuel level signal indicative of a fuel level in the first fuel tank, a fuel loading operator input device configured to generate a fuel loading signal, a fueling mode operator input device configured to generate a fueling mode signal, and a control module. The first fuel tank is configured to supply fuel to the prime mover, and selectively receive or supply fuel to a second fuel tank through a fuel pump. The control module is configured to generate a fuel transfer signal as a function of the fuel loading signal, the fueling mode signal, and the fuel level signal.

20 Claims, 4 Drawing Sheets

(56) References Cited

U.S. PATENT DOCUMENTS

| | | | |
|---|---|---|---|
| 7,502,668 B2 * | 3/2009 | Schaper et al. | 700/287 |
| 7,692,409 B2 * | 4/2010 | Schaper et al. | 320/157 |
| 2003/0163994 A1 | 9/2003 | Kuramoto et al. | |
| 2004/0010349 A1 * | 1/2004 | Perez et al. | 700/287 |
| 2008/0185048 A1 | 8/2008 | Mellon et al. | |
| 2011/0197988 A1 * | 8/2011 | Van Vliet et al. | 141/1 |

* cited by examiner

GENESET FUEL TRANSFER SYSTEM AND METHOD

RELATED APPLICATIONS

This application is based on and claims the benefit of priority from U.S. Provisional Application No. 61/317,882 by Edward M. Schroeder et al., filed Mar. 26, 2010, the contents of which are expressly incorporated herein by reference.

TECHNICAL FIELD

The present disclosure relates generally to fuel transfer systems and methods. Specifically, the present invention relates to fuel transfer systems and methods related to electric power generator sets (interchangeably referred to as "gensets").

BACKGROUND

The prime mover on a genset may be supplied with fuel from a primary fuel tank which is connected to a supplemental fuel tank. The connection may include a fuel pump which may be turned on and off to transfer fuel between tanks A genset may be sold as a unit where the primary tank is integral to the genset. For example, it may be attached to and even part of the genset frame. In other installations, the primary fuel tank may be separate.

This offers several advantages. When the primary fuel tank is integral to the genset unit, the genset may be set up on-site and hooked to an already existing fuel tank. If the genset is to be moved, the fuel can be emptied from the primary tank beforehand. Having the primary fuel tank in closer proximity to the prime mover can prevent fueling problems encountered when the fuel has to travel long distances from a tank. Having one supplemental fuel tank that can be accessed by multiple machines makes fuel purchases more efficient as the purchased fuel can be put in one supplemental tank. The supplemental tank can be physically located in the most convenient place.

SUMMARY OF THE INVENTION

An electric generator set fuel control system is disclosed. The fuel control system includes an electric generator, a prime mover mechanically coupled to the generator, a first fuel tank, a fuel level sensor configured to generate a fuel level signal indicative of a fuel level in the first fuel tank, a fuel loading operator input device configured to generate a fuel loading signal, a fueling mode operator input device configured to generate a fueling mode signal, and a control module. The first fuel tank is configured to supply fuel to the prime mover, and selectively receive or supply fuel to a second fuel tank through a fuel pump. The control module is configured to generate a fuel transfer signal as a function of the fuel loading signal, the fueling mode signal, and the fuel level signal.

Additionally disclosed is an electric generator set fuel transfer method. The fuel transfer method includes generating a fuel level signal, generating a fuel loading signal, generating a fueling mode signal, and generating a fuel transfer signal as a function of the fuel level signal, the fuel loading signal, and the fueling mode signal. The fuel level signal is generated with a fuel level sensor indicative of a fuel level in a first fuel tank, the first fuel tank configured to selectively receive or supply fuel to a second fuel tank through a fuel pump, and supply fuel to a prime mover, the prime mover mechanically coupled to an electric generator. The fuel loading signal is generated through a fuel loading operator input device. The fueling mode signal is generated through a fueling mode operator input device. The fuel transfer signal is generated with a control module.

Additionally disclosed is an electric generator set. The generator set includes a frame, an electric generator, a prime mover mechanically coupled to the generator, a first fuel tank, a fuel level sensor, a terminal box. The electric generator, the prime mover, the first fuel tank, and the terminal box are fixedly connected to the frame. The first fuel tank is configured to supply fuel to the prime mover, and selectively receive or supply fuel to a second fuel tank through a pump. The fuel level sensor is configured to generate a fuel level signal indicative of a fuel level in the first fuel tank.

The terminal box includes a fuel loading operator input device, a fueling mode operator input device, and a control panel. The fuel loading operator input device is configured to generate a fuel loading signal. The fueling mode operator input device is configured to generate a fueling mode signal. The control panel includes at least one signal output port configured to be selectively connected to the fuel pump, a control module, and a display panel.

The control module is configured to generate a fuel transfer signal as a function of the fuel loading signal, the fueling mode signal, and the fuel level signal, and transmit the fuel transfer signal to the signal output port. The display panel is configured to display fueling information as a function of the fuel loading signal, the fueling mode signal, or the fuel level signal.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
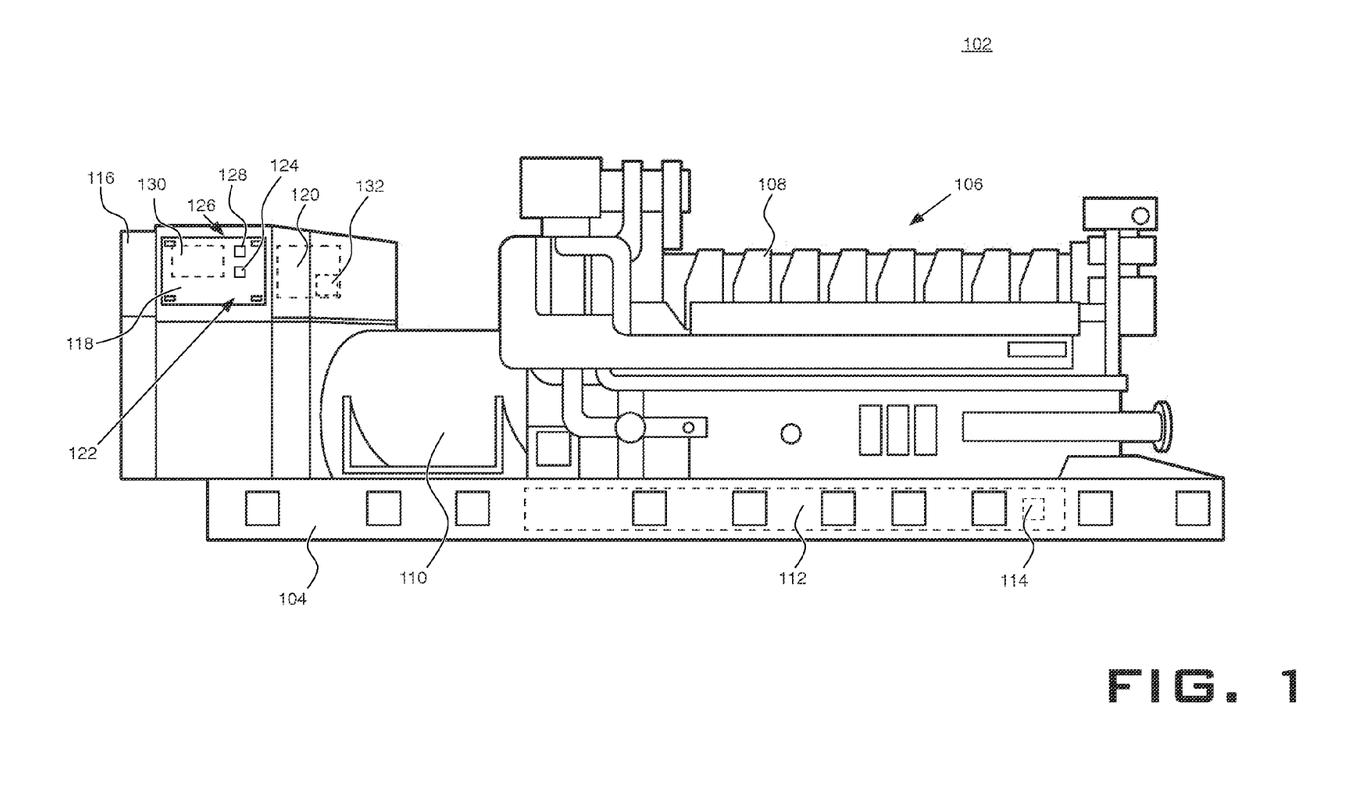
FIG. 1 depicts an exemplary embodiment of a genset.

Referring now to FIG. 1, an exemplary embodiment of a genset 102 is depicted. The genset 102 includes a frame 104, a prime mover 106, a generator 110, a first fuel tank 112, a fuel level sensor 114, and a terminal box 116.

In the depicted embodiment, the prime mover 106 is an internal combustion engine 108. The engine 108 burns fuel to produce a mechanical rotation. The engine 108 is mechanically coupled to the generator 110 through a mechanical link 146 (shown in relation to FIG. 2) in such a way as to transmit mechanical rotation and drive the generator 110. In alternative embodiments the prime mover 106 may be any device which provides the energy to drive the generator 110. For example, prime mover 106 may include a turbine engine (not shown), or a rotary engine (not shown).

The generator 110 may be any of a variety of electromechanical devices that convert mechanical power into electrical power. The mechanical power may be converted to electrical power through Faraday induction effects between moving and stationary current carrying coils and/or magnets. Illustrative and non-limiting examples of generator 104 include an AC induction generator, a permanent-magnet generator, an AC asynchronous generator, or a switched reluctance generator.

Terminal box 116 may include a structure for mounting electronic controls for controlling the genset 102, and in which power conductors from the generator 110 may be connected to leads which may supply electrical loads with electrical power. Terminal box 116 may include a cover and such accessories as mounting hardware, brackets, locks, and conduit fittings. Terminal box 116 may be constructed to provide protection for the electronic controls and power connections. Terminal box 116 may be mounted on the generator 110.

In the embodiment depicted, the prime mover 108, generator 110, and terminal box 116 are fixedly connected to frame 104. This allows the genset 102 to be easily moved and set-up at work sites as one unit. The genset 102 may include other components in addition to those shown that are also fixedly attached to the frame 104. For example, a fan (not shown), a heat exchange (not shown), and/or batteries (not shown) may be fixedly connected to the frame 104.

Another embodiment of a genset 102 with the fuel control system 100 described below may not include a frame 104. The prime mover 106 and generator 110 may be installed and separately mounted at a work site.

Other genset 102 embodiments may not include the terminal box 116, but may instead include other means of mounting electronic controls.

In the embodiment depicted, first fuel tank 112 is fixedly connected to, and integral to frame 104. In FIG. 1, the first fuel tank 112 is depicted in dotted lines to indicate that it is integrated into the frame 104 and base of the genset 102. In other embodiments of genset 102, the first fuel tank may be fixedly connected to frame 104 in other positions.

In alternative embodiment of genset 102 with fuel control system 100 (described in relation to FIG. 2), the first fuel tank 112 may not be fixedly connected to frame 104. The first fuel tank 112, for example, may be installed underground or may be free standing near the genset 102.

Figure 2:
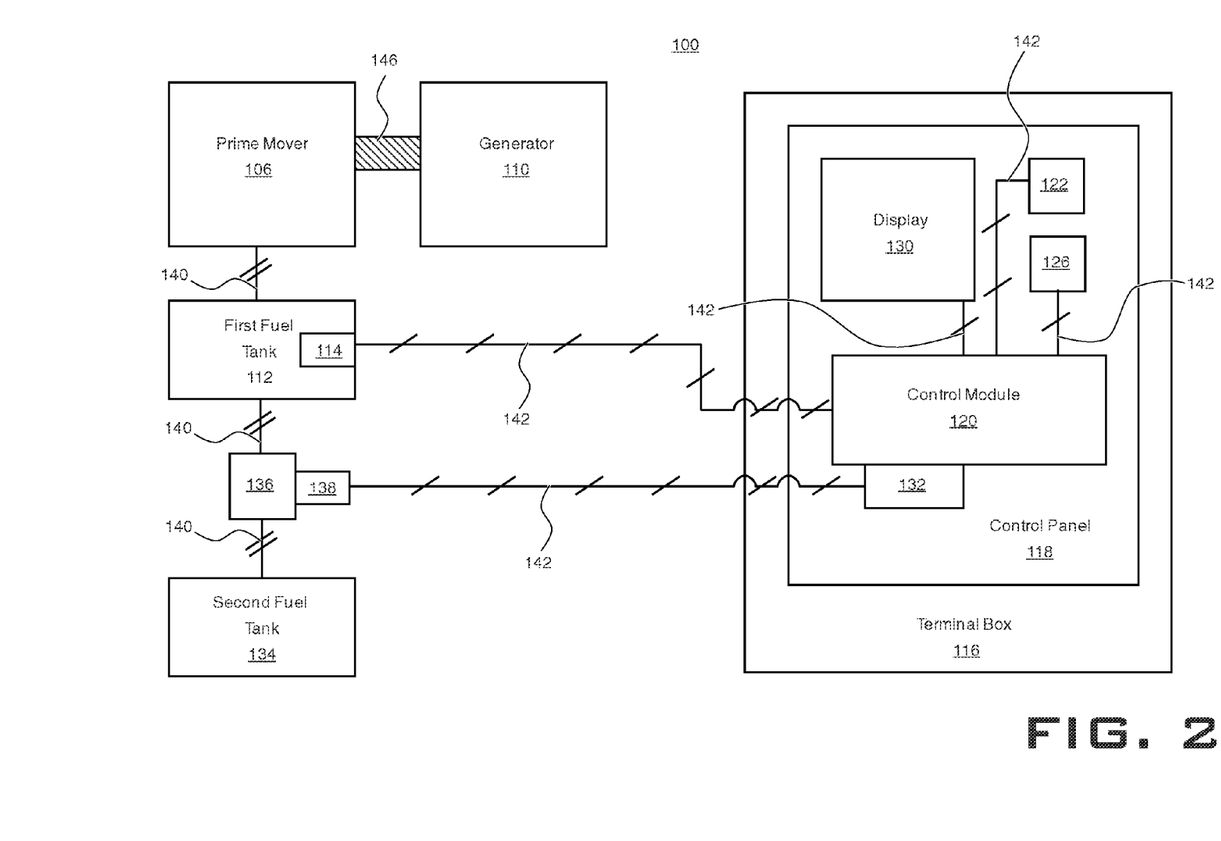
FIG. 2 is a schematic illustration of an exemplary embodiment of a genset fuel transfer method.

The first fuel tank 112 is configured to supply fuel to the prime mover 106, and selectively receive or supply fuel to a second fuel tank 134 (shown in relation to FIG. 2) through a fuel pump 136 (shown in relation to FIG. 2). Supplying fuel to a prime mover 106 from a first fuel tank 112 is well known in the art.

The fuel level sensor 114 is configured to generate a fuel level signal indicative of a fuel level in first fuel tank 112. Fuel level sensors 114 are well known in the art. Fuel level sensor 114 may include any device that produces a signal indicative of a fuel level in a tank which would be known to an ordinary person skilled in the art now or in the future.

The terminal box 116 in the depicted embodiment includes a fuel loading operator input device 122, a fueling mode operator input device 126, and a control panel 118.

The fuel loading operator input device 122 is configured to generate a fuel loading signal. The fuel loading operator input device 122 may include a two position toggle switch 124 configured to allow the operator to choose between a "Load" option or an "Unload" option. As explained below in relation to FIGS. 3A and 3B, the "Load" option may enable transfer of fuel from the second fuel tank 134 to the first fuel tank 112. The "Unload" option may enable the transfer of fuel from the first fuel tank 112 to the second fuel tank 134.

In alternative embodiments, the fuel loading operator input device 122 may include switches, buttons, keyboards, interactive displays, levers, dials, remote control devices, voice activated controls, or any other operator input devices that a person skilled in the art would understand would be functional in the disclosed embodiments.

The fueling mode operator input device 126 is configured to generator a fueling mode signal. The fueling mode operator input device 126 may include a three position toggle switch 128 configured to allow the operator to choose between an "Auto" option, a "Manual" option, or an "Off" option. As explained below in relation to FIGS. 3A and 3B, the "Auto" option may enable transfer of fuel between the first fuel tank 112 and the second fuel tank 134 in an automatic mode. The "Manual" option may enable transfer of fuel between the first fuel tank 112 and the second fuel tank 134 in an operator controlled mode. The "Off" option may disable fuel transfer.

In alternative embodiments, the fueling mode operator input device 126 may include switches, buttons, keyboards, interactive displays, levers, dials, remote control devices, voice activated controls, or any other operator input devices that a person skilled in the art would understand would be functional in the disclosed embodiments.

Although the fuel loading operator input device 122 and the fueling mode operator input device 126 are depicted mounted on the control panel 130 in the depicted embodiment, in alternative embodiments the fuel loading operator input device 122 and the fueling mode operator input device 126 may be fixedly connected to the genset 102 in any other location where an ordinary person skilled in the art now or in the future would understand them to be functional. In other embodiments, the fuel loading operator input device 122 and the fueling mode operator input device 126 may be located remotely from the genset 102.

In the depicted embodiment, the control panel 118 includes a control module 120, a display 130, and at least one signal output port 132. The control panel 118 may consolidate electronic controls, displays, operator input devices, processors, memory, and/or electronic, electrical, communicative and/or digital input and output ports into one device. This may provide an integrated control interface which may allow the operator to control and view different characteristics and responses of the genset 102. The control panel 118 may be fixedly attached to the terminal box 116, may be mounted elsewhere on the genset 102, or may be mounted remotely.

The control module 120 may include a processor (not shown) and a memory component (not shown). The processor may be microprocessors or other processors as known in the art. In some embodiments the processor may be made up of multiple processors. The processor may execute instructions for generating a fuel transfer signal and controlling fuel transfer between the first fuel tank 112 and the second fuel tank 134, such as the methods described below in connection with FIGS. 3A and 3B. Such instructions may be read into or incorporated into a computer readable medium, such as the memory component or provided external to processor. In alternative embodiments, hard-wired circuitry may be used in place of or in combination with software instructions to implement a fuel transfer method. Thus embodiments are not limited to any specific combination of hardware circuitry and software.

The term "computer-readable medium" as used herein refers to any medium or combination of media that participates in providing instructions to processor for execution. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer or processor can read.

The memory component may include any form of computer-readable media as described above. The memory component may include multiple memory components.

The control module 120 may be enclosed in a single housing. In alternative embodiments, the control module 120 may include a plurality of components operably connected and enclosed in a plurality of housings. The control module 120 may be an integral part of the control panel 118 and may be fixedly connected to the terminal box 116. In another embodiment, the control module 120 may be fixedly attached to the prime mover 106, the generator 110, and/or the frame 104 in a location other than the terminal box 116. In still other embodiments the control module 120 may be located in a plurality of operably connected locations including being fixedly attached to the frame 104, the prime mover 106, the generator 110, the terminal box 116, and/or remotely to the genset 102.

The control module 120 may be configured to generate a fuel transfer signal as a function of the fuel loading signal, the fueling mode signal, and the fuel level signal. In one embodiment, the fuel transfer signal may be a signal that commands a fuel pump relay 138 (shown in relation to FIG. 2) to open or close in a manner that controls or powers the fuel pump 136 to pump fuel between the first fuel tank 112 and the second fuel tank 134. In other embodiments the fuel transfer signal may be a digital signal, or any other signal that would control, actuate, or power the fuel pump 136 to pump fuel between the first fuel tank 112 and the second fuel tank 134 that would be known by an ordinary person skilled in the art now or in the future.

The control module 120 may be communicatively coupled to the fuel pump relay 138 or the fuel pump 136 through the at least one signal output port 132. The control module 120 may be communicatively coupled to the fuel level sensor 114 to receive the fuel level signal. The control module 120 may be communicatively coupled to the fuel loading operator input device 122. The control module 120 may be communicatively coupled to the fueling mode operator input device 126. The control module 120 may be communicatively coupled to the display 130.

In the depicted embodiment, the display 130 is an integral element of the control panel 118. In alternative embodiments the display 130 may located at another location of the genset 102 or may be located remotely from the genset 102. The display may include any electronic device that presents information in visual form which would be known to an ordinary person skilled in the art now or in the future.

The display 130 may be communicatively coupled to the fuel loading operator input device 122 and/or the fueling mode operator input device 126 through the control module 120, directly, or in another method that would be known by an ordinary person skilled in the art now or in the future.

The display 130 may be configured to display fueling information as a function of the fuel level signal, the fuel loading signal, the fueling mode signal and/or the fuel transfer signal. In one embodiment the display 130 may display information which is indicative of the fuel level in the first fuel tank 112. In an alternative embodiment, the display 130 may display information indicative that fuel is being pumped into the first fuel tank 112 from the second fuel tank 134. In another embodiment the display 130 may display information indicative that fuel is being pumped into the second fuel tank 134 from the first fuel tank 112. In still another embodiment the display 130 may display information on what fueling mode the genset 102 or the control system 100 is being operated in. Other examples of information the display 130 may display is information indicative of the activation of an overflow option, an alarm or warning for a low fuel level and/or a high fuel level, and a visual indicator that the genset 102 is in a shutdown mode due to low fuel.

The at least one signal output port 132 may include any one or more devices that a signal may be transmitted through that would be known to an ordinary person skilled in the art now or in the future. In one embodiment a signal output port 132 may include a connector through which an analogue electrical or optical signal may be transmitted. In another embodiment the signal output port 132 may include a connector through which a digital signal may be transmitted. In still another embodiment the signal output port may include a radio wave transmitter operable to transmit a signal.

The at least one signal output port 132 may include any communicative connector operable to transmit the fuel transfer signal from the control module 120 to the fuel pump relay 138 or the fuel pump 136. The at least one signal output port 132 may be configured to allow the connection of an analogue or digital communication link between the output port 132 and the fuel pump relay 138 or the fuel pump 136. In another embodiment the at least one signal output port 132 may be configured to transmit radio signals that may be received by a receiver in the fuel pump relay 138.

In one embodiment, the control module 120 may include a plurality of signal output ports 132. The control module 120 may be operable to allow programming of the plurality of signal output ports 132 to a selection of different signal outputs 132. In one embodiment, the control module 120 may be operable to program one signal output port 132 to act as a "LOAD" relay and another signal output port 132 to act as an "UNLOAD" relay. The "LOAD relay is activated when the fuel transfer signal indicates that the fuel pump 136 is to pump fuel from the second fuel tank 134 to the first fuel tank 112. The "UNLOAD" relay is activated when the fuel transfer signal indicates that the fuel pump 136 is to pump fuel from the first fuel tank 112 to the second fuel tank 134.

When the fuel pump relay 138 is connected to the at least one signal output port 132, the relay 138 may activate the fuel pump 136 to pump in a forward direction upon activation of the "LOAD" relay, and may activate the fuel pump to pump is a reverse direction upon activation of the "UNLOAD relay. In alternative embodiments, the fuel pump relay 138 may be controlled with digital or other type communication links 142 as would be known to an ordinary person skilled in the art now or in the future. The at least one output signal port 132 is configured to connect with the fuel pump relay 138 through the communication link 142 (shown in relation to FIG. 2).

Referring now to FIG. 2, an embodiment of the fuel control system 100 is schematically depicted. The control system 100 includes the prime mover 108, the electric generator 110, the first fuel tank 112, the fuel level sensor 114, the terminal box 116, the control panel 118, the control module 120, the fuel loading operator input device 122, the fueling mode operator input device 126, the display 130, the signal output port 132, the second fuel pump, the fuel pump 136, the fuel pump relay 138, fuel lines 140, communication links 142, and the mechanical link 146. Elements numbered similarly in FIG. 1 and FIG. 2 are as described in relation to FIG. 1 and will not be further described below.

The fuel pump 136 may be selectively powered to pump fuel between the first fuel tank 112 and the second fuel tank 134 through a fuel pump relay 138.

The fuel loading operator input device 122 is communicatively coupled to the control module through communication link 142.

The fuel level sensor 114 may be communicatively coupled to the control module 120 through the communication link 142.

The fueling mode operator input device 126 is communicatively coupled to the control module through communication link 142.

The first fuel tank 112 may be selectively fluidly connected to the second fuel tank 134 through the fuel pump 136 and fuel lines 140. The fuel pump 136 may be selectively activated to operate in a forward or reverse direction by the fuel pump relay 138. When the fuel pump operates in a forward direction, fuel may be pumped from the second fuel 134 to the first fuel tank 112. When the fuel pump 136 operates in the reverse direction, fuel may be pumped from the first fuel tank 112 to the second fuel tank 114.

The at least one signal output port 132 may be configured to be communicatively connectable to the fuel pump relay through the communication link 142.

When the fuel pump relay 138 is connected to the at least one signal output port 132, the relay 138 may activate the fuel pump 136 to pump in a forward direction upon activation of the "LOAD" relay, and may activate the fuel pump 136 to pump in a reverse direction upon activation of the "UNLOAD" relay. In alternative embodiments, the fuel pump relay 138 may be controlled with digital or other type communication links 142 as would be known to an ordinary person skilled in the art now or in the future. The at least one output signal port is configured to connect with the fuel pump relay 138 through the communication link 142.

Industrial Applicability

Figure 3A:
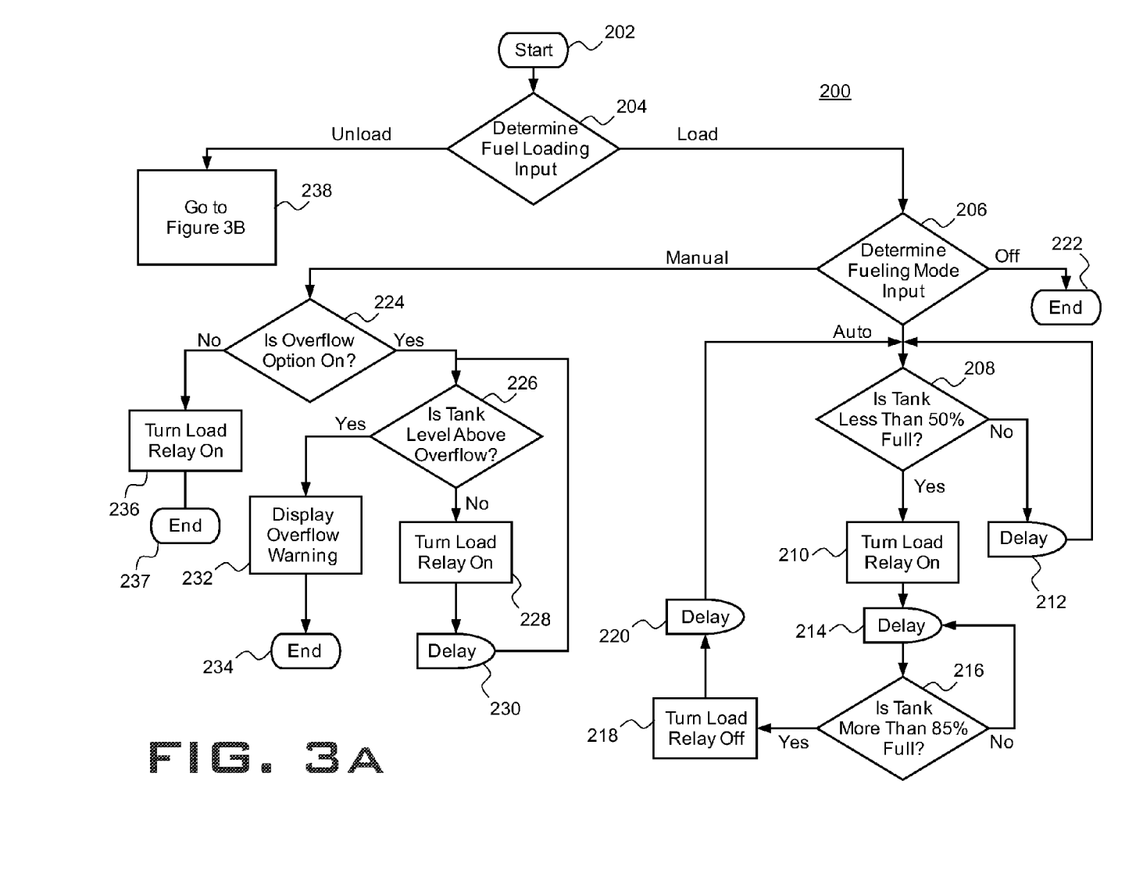
FIGS. 3A and 3B are a flow chart of an exemplary genset fuel transfer method.
Figure 3B:
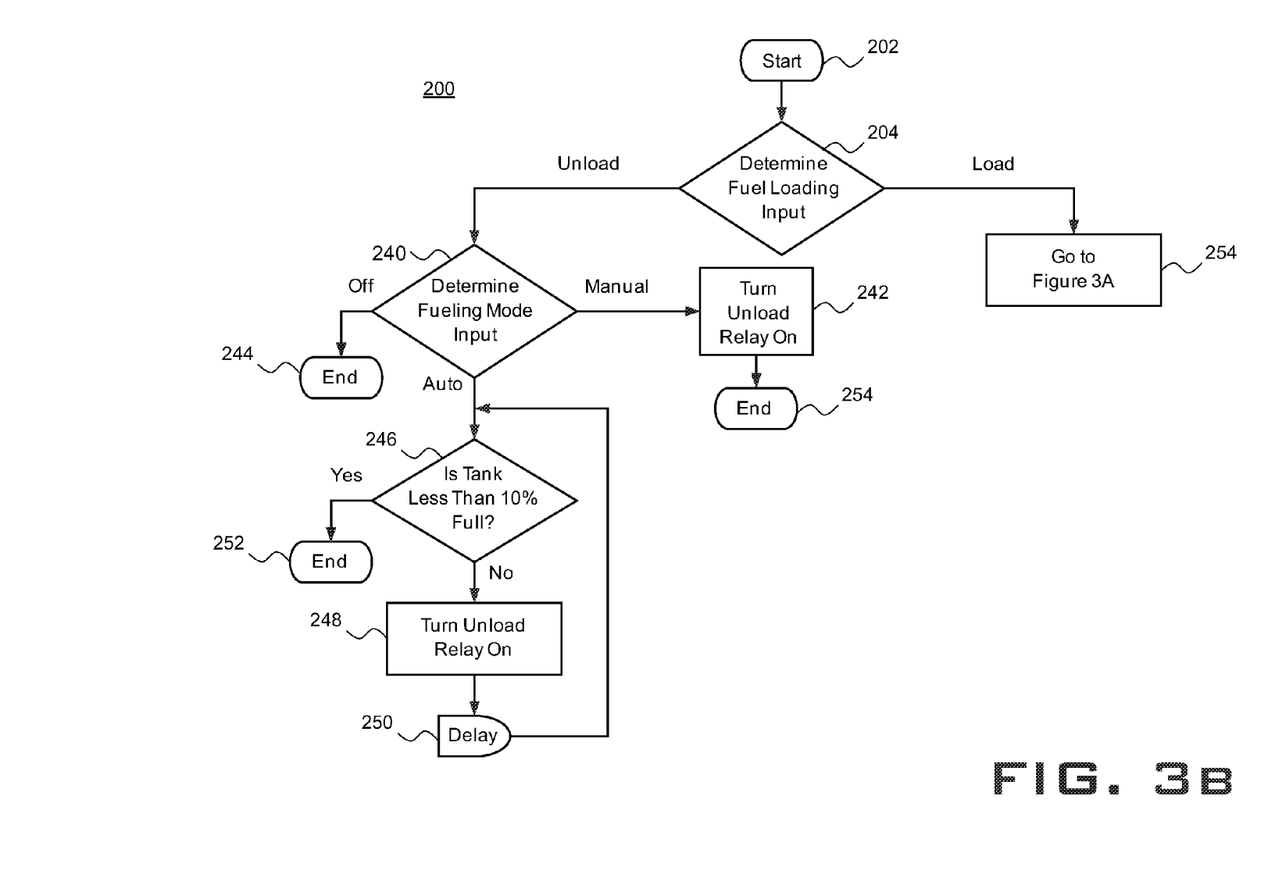

Referring now to FIGS. 3A and 3B a flow chart of a fuel transfer method 200 for an electric genset is depicted. The method 200 includes generating a fuel level signal indicative of a fuel level in a first fuel tank, generating a fuel loading signal, generating a fueling mode signal, and generating a fuel transfer signal as a function of the fuel level signal, the fuel loading signal, and the fueling mode signal.

Referring to FIG. 3A, the method 200 starts at step 202. The method 200 advances from step 202 to decision box 204. In decision box 204 a fuel loading input is determined. The fuel loading input may be determined through the fuel loading operator input device 122. In one embodiment, the fuel loading operator input device 122 may be used to select between a "LOAD" and an "UNLOAD" option. The "LOAD" option may indicate that it's desirous that fuel be pumped from the second fuel tank 134 to the first fuel tank 112. The "UNLOAD" option may indicate that it's desirous that fuel be pumped from the first fuel tank 112 to the second fuel tank 134.

If the fuel loading input is determined to be "UNLOAD" the method 200 advances from decision box 204 to the flow chart shown in FIG. 3B which will be discussed in greater detail below. If the fuel loading input is determined to be "LOAD" the method 200 advances from decision box 204 to decision box 206.

In decision box 206, a fueling mode input is determined. The fueling mode input may be determined through the fueling mode operator input device 126. In one embodiment, the fueling mode operator input device 126 may be used to select between an "AUTO", an "OFF", and a "MANUAL" option.

An "AUTO" option may indicate that it's desirous to selectively automatically pump fuel from the second fuel tank 134 to the first fuel tank 112 in such a manner that the fuel level in the first fuel tank 112 remains between a preset first minimum level and a preset first maximum level. The first minimum level may be, for example, fifty percent of capacity (50%); and the first maximum level may be, for example, eighty-five percent (85%) in one embodiment. Other pre-set minimum and maximum levels may also be used. In some embodiments, an operator may selectively program the minimum and maximum levels.

An "OFF" option may indicate that it's not desirous for any fuel to be transferred between the second fuel tank 134 and the first fuel tank 112.

A "MANUAL" option may indicate that it's desirous for an operator to manually control the transfer of fuel from the second fuel tank 134 to the first fuel tank 112. In one embodiment, the fueling mode operator input device 126 may be a toggle switch 128 in which the "MANUAL" position is spring loaded. An operator may be required to hold the switch 128 in the "MANUAL" position for as long as he/she wants fuel to be pumped from the second fuel tank 134 to the first fuel tank 112.

If the fueling mode input is determined to be "OFF", the method 200 advances from decision box 206 to the end of the method 222. If the fueling mode input is determined to be "MANUAL", the method 200 advances from decision box 206 to decision box 224 which will be further discussed below. If the fueling mode input is determined to be "AUTO", the method 200 advances from decision box 206 to decision box 208.

In decision box 208, it is determined if the fuel level in the first fuel tank 112 is below the first minimum level. The fuel level sensor 114 may generate a signal indicative of the fuel level in the first fuel tank 112. The fuel level sensor 112 may be communicatively coupled to the control module 120 and transmit the fuel level signal to the control module 120. The control module 120 may receive the fuel level signal and determine if the first fuel tank is below the first minimum level.

If it is determined that the fuel level in the first fuel tank 112 is not below the first minimum level the method 200 advances to Delay 212. After Delay 212, the method 200 returns to decision block 208 as long as the fueling mode remains in "AUTO" and the fuel loading input remains "LOAD".

If it is determined that the fuel level in the first fuel tank 112 is below the first minimum level the method 200 advances to block 210. In block 210, a fuel transfer signal may be generated by the control module 120 indicating that fuel should be transferred from the second fuel tank 134 to the first fuel tank 112. The control module 120 may transmit the fuel transfer signal through the signal output port 132. The signal output port 132 may be communicatively coupled to the fuel pump relay 138 in such a way that the fuel pump relay 138 powers the fuel pump 136 to pump fuel from the second fuel tank 134 to the first fuel tank 112. As described above embodiments may encompass analogue, digital, radio, and other forms of signals and transmission.

The method 200 advances from block 210 to Delay 214. After the Delay 214, the method 200 advances to decision block 216. In decision block 216, it is determined if the fuel level in first fuel tank 112 is above the first maximum level. If the fuel level in the first fuel tank is not below the first maximum level, the method 200 returns to Delay 214. If the fuel level in first fuel tank 112 is above the first maximum level, the method 200 advances to block 218.

In block 218, the control module 120 generates a fuel transfer signal to stop the fuel pump from pumping fuel from the second fuel tank 134 to the first fuel tank 112. In one embodiment, the control module 120 turns the load relay off. When the load relay is turned off the fuel pump relay 138 ceases to supply power to the fuel pump 136 to pump fuel.

The method 200 advances from block 218 to Delay 220. The method 200 advances from Delay 220 back to decision block 208 and the method 200 continues in the "AUTO" loop represented by steps 208-220 as long as the fueling mode input is "AUTO" and the fuel loading input is "LOAD".

If it is determined in decision block 206, that the fueling mode is "MANUAL", the method 200 advances to decision block 224. In decision block 224, it is determined if an overflow option is enabled. An overflow option may prevent the transfer of fuel from the second fuel tank 134 to the first fuel tank 112 if the fuel level in the first fuel tank is above a preset second maximum level. The overflow option may also display a warning or other visual indication on the display 130 when the fuel level in the first fuel tank 112 is above the second maximum level. An operator may be able to choose whether to enable the overflow option. The operator may also be able to program the value of the second maximum level.

If the overflow option is enabled, the method 200 advances from decision box 224 to decision box 226. In decision box 226 it is determined if the fuel level in the first fuel tank 112 is above the second maximum level. If the fuel level in the first fuel tank 112 is above the second maximum level, the method 200 advances to block 232.

In block 232, an overflow warning is displayed on the display 130. In addition to the overflow warning being displayed, an audio warning or other indication may be given to the operator that the fuel level in the first fuel tank 112 is above the second maximum level. The method 200 advances from block 232 to block 234 and ends.

If in decision block 226, the fuel level in the first fuel tank 112 is determined to be below the second maximum level, the method 200 advances to block 228. In block 228, a fuel transfer signal may be generated by the control module 120 indicating that fuel should be transferred from the second fuel tank 134 to the first fuel tank 112. The control module 120 may transmit the fuel transfer signal through a signal output port 132. The signal output port 132 may be communicatively coupled to the fuel pump relay 138 in such a way that the fuel pump relay 138 powers the fuel pump 136 to pump fuel from the second fuel tank 134 to the first fuel tank 112. As described above embodiments may encompass analogue, digital, radio, and other forms of signals and transmission.

The method 200 advances from block 228 to Delay 230. The method 200 advances from block 230 to decision block 226. The method 200 continues in this loop as long as the fuel loading input is "LOAD", the fueling mode input is "MANUAL", and the overflow option is enabled.

If in decision block 224, it is determined that the overflow option is not enabled, the method 200 advances to block 236. In block 236, a fuel transfer signal may be generated by the control module 120 indicating that fuel should be transferred from the second fuel tank 134 to the first fuel tank 112. The control module 120 may transmit the fuel transfer signal through a signal output port 132. The signal output port 132 may be communicatively coupled to the fuel pump relay 138 in such a way that the fuel pump relay 138 powers the fuel pump 136 to pump fuel from the second fuel tank 134 to the first fuel tank 112. As described above embodiments may encompass analogue, digital, radio, and other forms of signals and transmission.

The method 200 then advances to end block 237. The fuel transfer signal may continue to indicate that fuel should be transferred from the second fuel tank 134 to the first fuel tank 112 as long as the fuel loading input remains "LOAD", the fueling mode input remains "MANUAL", and the overflow option is not enabled.

Referring now to FIG. 3B, if it is determined that the fuel loading input is "UNLOAD" in block 204, the method 200 advances to decision block 240. In decision block 240, the fueling mode input is determined.

An "AUTO" option may indicate that it's desirous to selectively automatically pump fuel from the first fuel tank 112 to the second fuel tank 134 if the fuel level in the first fuel tank 112 is above a preset second minimum level. The second minimum level may be, for example, ten percent of capacity (10%) in one embodiment. Other pre-set second minimum levels may also be used. In some embodiments, an operator may selectively program the second minimum level.

An "OFF" option may indicate that it's not desirous for any fuel to be transferred between the first fuel tank 112 and the second fuel tank 134.

A "MANUAL" option may indicate that it's desirous for an operator to manually control the transfer of fuel from the first fuel tank 112 to the second fuel tank 134. In one embodiment, the fueling mode operator input device 126 may be a toggle switch 128 in which the "MANUAL" position is spring loaded. An operator may be required to hold the switch 128 in the "MANUAL" position for as long as he/she wants fuel to be pumped from the first fuel tank 112 to the second fuel tank 134.

If the fueling mode input is determined to be "OFF", the method 200 advances to block 244 and ends.

If the fueling mode input is determined to be "AUTO", the method 200 advances to decision block 246. In decision block 246, it is determined if the fuel level in the first fuel tank 112 is above the second minimum level. If the fuel level in the first fuel tank 112 is below the second minimum level, the method 200 advances to block 252 and ends.

If it is determined in block 246, that the fuel level in the first fuel tank 112 is not below the second minimum level, the method 200 advances to block 248. In block 248, a fuel transfer signal may be generated by the control module 120 indicating that fuel should be transferred from the first fuel tank 112 to the second fuel tank 134. The control module 120 may transmit the fuel transfer signal through a signal output port 132. The signal output port 132 may be communicatively coupled to the fuel pump relay 138 in such a way that the fuel pump relay 138 powers the fuel pump 136 to pump fuel from the first fuel tank 112 to the second fuel tank 134. As described above embodiments may encompass analogue, digital, radio, and other forms of signals and transmission.

The method 200 advances from block 248 to Delay 250. The method 200 advances from Delay 250 back to decision block 246. The method continues in the "AUTO" loop while the fuel loading input remains "UNLOAD", and the fueling mode input remains "AUTO".

If it is determined in block 240 that the fueling mode input is "MANUAL", the method 200 advances to block 242. In block 242, a fuel transfer signal may be generated by the control module 120 indicating that fuel should be transferred from the first fuel tank 112 to the second fuel tank 134. The control module 120 may transmit the fuel transfer signal through a signal output port 132. The signal output port 132 may be communicatively coupled to the fuel pump relay 138 in such a way that the fuel pump relay 138 powers the fuel pump 136 to pump fuel from the first fuel tank 112 to the second fuel tank 134. As described above embodiments may encompass analogue, digital, radio, and other forms of signals and transmission.

The method 200 then advances to end block 254. The fuel transfer signal may continue to indicate that fuel should be transferred from the first fuel tank 112 to the second fuel tank 134 as long as the fuel loading input remains "UNLOAD", and the fueling mode input remains "MANUAL".

From the foregoing it will be appreciated that, although specific embodiments have been described herein for purposes of illustration, various modifications or variations may be made without deviating from the spirit or scope of inventive features claimed herein. Other embodiments will be apparent to those skilled in the art from consideration of the specification and figures and practice of the arrangements disclosed herein. It is intended that the specification and disclosed examples be considered as exemplary only, with a true inventive scope and spirit being indicated by the following claims and their equivalents.

What is claimed is:

1. An electric generator set fuel control system, comprising:
   an electric generator;
   a prime mover mechanically coupled to the generator;
   a first fuel tank configured to supply fuel to the prime mover, and selectively receive fuel from a second fuel tank and supply fuel to the second fuel tank through a fuel pump;
   a fuel level sensor configured to generate a fuel level signal indicative of a fuel level in the first fuel tank;
   a user interface including:
      a fuel loading operator input device for allowing an operator to select a fuel loading input, the fuel loading operator input device configured to generate a fuel loading signal as a function of the selected fuel loading input; and
      a fueling mode operator input device for allowing an operator to select a fuel mode input, the fueling mode operator input device configured to generate a fueling mode signal as a function of the selected fuel mode input; and
   a control module configured to generate a fuel transfer signal as a function of the fuel loading signal, the fueling mode signal, and the fuel level signal.

2. The fuel control system of claim 1, further comprising a display configured to display fueling information as a function of the fuel loading signal, the fueling mode signal, or the fuel level signal.

3. The fuel control system of claim 1, further comprising a frame, wherein the electric generator, the prime mover, and the first fuel tank are fixedly connected to the frame.

4. The fuel control system of claim 3, further comprising a terminal box fixedly connected to the frame and including the fuel loading operator input device, the fueling mode operator input device, and the control module.

5. The fuel control system of claim 1, further comprising a terminal box including the fuel loading operator input device, the fueling mode operator input device and the control module.

6. The fuel control system of claim 1, further comprising a control panel including a display and the control module, the display configured to display fueling information as a function of the fuel loading signal, the fueling mode signal, or the fuel level signal.

7. The fuel control system of claim 6, wherein the control panel includes at least one signal output port configured to be selectively connected to the fuel pump.

8. The fuel control system of claim 7, wherein the pump may be selectively connected to the at least one signal output port through a power relay configured to power the fuel pump to pump fuel to or from the first fuel tank to the second fuel tank.

9. The fuel control system of claim 7, wherein the control panel is configured to transmit the fuel transfer signal through the at least one signal output port.

10. The fuel control system of claim 6, wherein the control panel includes the fuel loading operator input device, and the fueling mode operator input device.

11. The fuel control system of claim 1, wherein the fuel loading operator input device includes a toggle switch having a load position and an unload position.

12. The fuel control system of claim 1, wherein the fueling mode operator input device includes a toggle switch having an auto position, an off position, and a manual position.

13. An electric generator set fuel transfer method, comprising:
   generating a fuel level signal with a fuel level sensor indicative of a fuel level in a first fuel tank, the first fuel tank configured to selectively receive fuel from and supply fuel to a second fuel tank through a fuel pump, and supply fuel to a prime mover, the prime mover mechanically coupled to an electric generator,
   selecting a fuel loading input with a user interface,
   generating a fuel loading signal as a function of the fuel loading input,
   selecting a fueling mode with a user interface,
   generating a fuel signal as a function of the fueling mode, and
   generating a fuel transfer signal with a control module as a function of the fuel level signal, the fuel loading signal, and the fueling mode signal.

14. The fuel transfer method of claim 13, further comprising displaying fueling information as a function of the fuel level signal, the fuel loading signal, or the fueling mode signal.

15. The fuel transfer method of claim 14, wherein the fueling information includes the fuel level in the first fuel tank.

16. The fuel transfer method of claim 14, wherein the fueling information includes a visual indicator of loading or unloading of fuel to the first fuel tank.

17. The fuel transfer method of claim 14, wherein the fueling information includes a fueling mode.

18. The fuel transfer method of claim 13, further comprising transmitting the fuel transfer signal to an output signal port, the output signal port configured to be selectively communicatively connected to the fuel pump.

19. The fuel transfer method of claim 18, further comprising transmitting the fuel transfer signal to a power relay configured to power the fuel pump to pump fuel to or from the first fuel tank to the second fuel tank.

20. An electric generator set, comprising:
   a frame;
   an electric generator fixedly connected to the frame;
   a prime mover mechanically coupled to the generator and fixedly connected to the frame;
   a first fuel tank fixedly connected to the frame and configured to supply fuel to the prime mover, and selectively receive fuel from a second fuel tank and supply fuel to the second fuel tank through a pump;
   a fuel level sensor configured to generate a fuel level signal indicative of a fuel level in the first fuel tank;
   a terminal box fixedly connected to the frame, the terminal box including:

a user interface including:
- fuel loading operator input device for allowing an operator to select a fuel loading input, the fuel loading operator input device signal configured to generate a fuel loading signal as a function of the selected fuel loading input; and
- a fueling mode operator input device for allowing an operator to select a fuel mode input, the fueling mode operator input device configured to generate a fueling mode signal as a function of the selected fuel mode input; and a control module including:
- at least one signal output port configured to be selectively connected to the fuel pump;
- a control module configured to generate a fuel transfer signal as a function of the fuel loading signal, the fueling mode signal, and the fuel level signal and transmit the fuel transfer signal to the signal output port; and
- a display panel configured to display fueling information as a function of the fuel loading signal, the fueling mode signal, or the fuel level signal.

\* \* \* \* \*

UNITED STATES PATENT AND TRADEMARK OFFICE
CERTIFICATE OF CORRECTION

Page 1 of 2

PATENT NO. : 8,950,446 B2
APPLICATION NO. : 13/071608
DATED : February 10, 2015
INVENTOR(S) : Folken et al.

It is certified that error appears in the above-identified patent and that said Letters Patent is hereby corrected as shown below:

On the title page, Item 54 delete "GENESET" and insert -- GENSET --.

In the specification

Column 1, line 1, delete "GENESET" and insert -- GENSET --.

Column 1, line 24, delete "tanks A" and insert -- tanks. A --.

Column 3, line 14, delete "108," and insert -- 106, --.

Column 3, line 20, delete "exchange" and insert -- exchanger --.

Column 3, line 35, delete "with fuel" and insert -- with a fuel --.

Column 7, line 4-6, delete "The fuel loading operator input device 122 is communicatively coupled to the control module through communication link 142." and insert -- The fuel level sensor 114 may be communicatively coupled to the control module 120 through a communication link 142. --.

Column 7, line 7-9, delete "The fuel level sensor 114 may be communicatively coupled to the control module 120 through the communication link 142." and insert -- The fuel loading operator input device 122 is communicatively coupled to the control module through communication link 142. --.

Column 10, line 55, delete "method continues" and insert -- method 200 continues --.

In the claims

Column 12, line 30, Claim 13, delete "fuel signal" and insert -- fueling mode signal --.

Column 13, line 2, Claim 20, delete "fuel" and insert -- a fuel --.

Signed and Sealed this
Twelfth Day of January, 2016

Michelle K. Lee
*Director of the United States Patent and Trademark Office*

CERTIFICATE OF CORRECTION (continued)
U.S. Pat. No. 8,950,446 B2

Column 13, line 4, Claim 20, delete "input device signal" and insert -- input device --.

Column 13, line 12, Claim 20, delete "module" and insert -- panel --.